(12) United States Patent
Huang et al.

(10) Patent No.: US 11,239,765 B2
(45) Date of Patent: Feb. 1, 2022

(54) MULTI-LEVEL CIRCUIT, THREE-PHASE MULTI-LEVEL CIRCUIT, AND CONTROL METHOD

(71) Applicant: HUAWEI TECHNOLOGIES CO., LTD., Guangdong (CN)

(72) Inventors: Zhuyong Huang, Dongguan (CN); Xiaofei Zhang, Dongguan (CN); Chuntao Zhang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 12 days.

(21) Appl. No.: 16/698,517

(22) Filed: Nov. 27, 2019

(65) Prior Publication Data

US 2020/0099313 A1     Mar. 26, 2020

Related U.S. Application Data

(63) Continuation of application No. PCT/CN2018/088783, filed on May 29, 2018.

(30) Foreign Application Priority Data

Jun. 2, 2017   (CN) .......................... 201710407831.4

(51) Int. Cl.
*H02M 7/483*     (2007.01)
*H02M 7/5387*    (2007.01)
(Continued)

(52) U.S. Cl.
CPC ......... *H02M 7/483* (2013.01); *H02M 7/5387* (2013.01); *H02M 1/0074* (2021.05); *H02M 7/487* (2013.01)

(58) Field of Classification Search
CPC ... H02M 2001/007; H02M 2001/0074; H02M 7/483; H02M 7/487; H02M 7/49; H02M 7/493; H02M 7/5387–5388
See application file for complete search history.

(56) References Cited

U.S. PATENT DOCUMENTS 10,141,865 B1 * 11/2018 Noman ................. H02M 7/483
2008/0112200 A1   5/2008 Tan et al.
(Continued)

FOREIGN PATENT DOCUMENTS

CN         103346690 A     10/2013
CN         102427305 B     3/2014
(Continued)

*Primary Examiner* — Fred E Finch, III
(74) *Attorney, Agent, or Firm* — Womble Bond Dickinson (US) LLP

(57) ABSTRACT

A multi-level circuit, a three-phase multi-level circuit, and a control method are provided. The multi-level circuit includes two groups of bus capacitors (C1 and C2) that are connected in series; a plurality of switching transistor branches that are connected in parallel to the capacitors, where each switching transistor branch includes a first half bridge (Q1 and Q2) and a second half bridge (Q3 and Q4), and a common terminal of the two half bridges is grounded (N); and two negative coupled inductors (L1 and L2), where each input terminal of each negative coupled inductor is connected to a common terminal (A1 and A2) of two switching transistors in the first half bridge in only one of the switching transistor branches. In this circuit, a quantity of groups of bus capacitors is decreased and circuit design complexity is reduced. Further, a dropout voltage of the switching transistors is reduced.

9 Claims, 10 Drawing Sheets

(51) Int. Cl.
*H02M 7/487* (2007.01)
*H02M 1/00* (2006.01)

(56) References Cited

U.S. PATENT DOCUMENTS

| | | | |
|---|---|---|---|
| 2012/0187879 A1 | 7/2012 | Galea et al. | |
| 2013/0301314 A1* | 11/2013 | Fu | H02J 3/38 363/37 |
| 2015/0016169 A1* | 1/2015 | Honea | H02M 7/5387 363/132 |
| 2015/0085541 A1 | 3/2015 | Hu et al. | |
| 2015/0170822 A1* | 6/2015 | Ye | H01F 38/023 363/132 |
| 2015/0270789 A1 | 9/2015 | Shi et al. | |
| 2015/0311822 A1* | 10/2015 | Ma | H02M 7/53871 363/98 |
| 2016/0172976 A1 | 6/2016 | Mu et al. | |
| 2016/0241161 A1* | 8/2016 | Haddad | H02M 7/483 |
| 2016/0268925 A1* | 9/2016 | Hu | H02M 7/487 |
| 2017/0149336 A1* | 5/2017 | Kidera | H02M 7/5387 |
| 2017/0155321 A1 | 6/2017 | Kidera et al. | |
| 2017/0250621 A1* | 8/2017 | Townsend | H02M 7/487 |
| 2018/0366261 A1* | 12/2018 | Bergquist | H02M 7/5387 |
| 2019/0312524 A1* | 10/2019 | Huang | H02M 7/483 |
| 2019/0363644 A1* | 11/2019 | Li | H02M 7/5387 |

FOREIGN PATENT DOCUMENTS

| | | |
|---|---|---|
| CN | 103762064 A | 4/2014 |
| CN | 104079195 A | 10/2014 |
| CN | 104362877 A | 2/2015 |
| CN | 104377976 A | 2/2015 |
| CN | 104935197 A | 9/2015 |
| CN | 105281361 A | 1/2016 |
| CN | 205265554 U | 5/2016 |
| CN | 107154745 A | 9/2017 |
| KR | 20160027408 A | 3/2016 |

\* cited by examiner

MULTI-LEVEL CIRCUIT, THREE-PHASE MULTI-LEVEL CIRCUIT, AND CONTROL METHOD

CROSS-REFERENCE TO RELATED APPLICATIONS

This application is a continuation of International Application No. PCT/CN2018/088783, filed on May 29, 2018, which claims priority to Chinese Patent Application No. 201710407831.4, filed on Jun. 2, 2017, The disclosures of the aforementioned applications are hereby incorporated by reference in their entireties.

TECHNICAL FIELD

This application relates to the field of power electronics technologies, and in particular, to a multi-level technology.

BACKGROUND

Nowadays, in the field of power electronics technologies, people have an increasingly high requirement for work efficiency of a power supply device such as in an uninterruptible power supply (UPS) or an inverter. According to an estimation, every 1% increase in UPS efficiency can save 300 million kilowatt-hours of power in data centers around the world. Therefore, how to increase efficiency of a power supply device has become a problem to be resolved urgently in the industry.

It is well-known that a multi-level technology can effectively reduce a loss of a semiconductor device and a loss of a magnetic device, and significantly improve work efficiency of a device, and has been widely used in recent years. Currently, most UPSs use a three-level technology, and a small quantity of power supply devices have begun to use a four-level or five-level technology. Although the multi-level technology can effectively reduce a circuit loss, a semiconductor device in a multi-level circuit is required to have relatively high voltage withstand performance. In addition, due to a relatively large quantity of groups of bus capacitors, a circuit topology is complex.

In an existing multi-level technology, for example, a four-level technology, there are four groups of bus capacitors: a capacitor C1, a capacitor C2, a capacitor C3, and a capacitor C4, as shown in FIG. 1. These bus capacitors lead to more devices and components, voltage equalization control becomes more complex, and even a dedicated balanced circuit needs to be added. In addition, in a four-level topology, a semiconductor device having relatively high voltage withstand performance needs to be used. For example, a voltage Vac of an output terminal is 220 volts (V) and a peak voltage is 311 V. When a switching transistor Q1 is turned on, a voltage at a point A is V1, and a voltage between two terminals of a switching transistor Q4 is V1-V4. Because the voltage V1 is greater than 311 V and the voltage V4 is less than −311V, the voltage between the two terminals of the switching transistor Q4 is greater than 611 V. If a peak voltage obtained upon turn-off is counted, the switching transistor Q4 requires a 1200 voltage (V) withstand capability to ensure safe use. Similarly, the switching transistor Q1 also requires a 1200 V withstand capability like the switching transistor Q4.

SUMMARY

This application provides a multi-level circuit, a three-phase multi-level circuit and a control method, so as to resolve a problem that a circuit topology of an existing multi-level circuit is complex due to high withstand voltage performance of a semiconductor switch and a relatively large quantity of groups of bus capacitors.

To achieve the foregoing objective, the following solutions are provided:

A first aspect of this application provides a multi-level circuit, including: a capacitance branch including a first capacitor and a second capacitor that are connected in series, at least two switching transistor branches that are connected in parallel to the capacitance branch, a first negative coupled inductor, and a second negative coupled inductor, where a common terminal of the first capacitor and the second capacitor is grounded; each switching transistor branch includes a first half bridge and a second half bridge, and a common terminal of the first half bridge and the second half bridge of each switching transistor branch is grounded; each input terminal of the first negative coupled inductor is connected to a common terminal of two switching transistors in the first half bridge of only one of the switching transistor branches; and each input terminal of the second negative coupled inductor is connected to a common terminal of two switching transistors in the second half bridge of only one of the switching transistor branches.

It can be learned from the foregoing process that two groups of bus capacitors are disposed in the multi-level circuit, so that a quantity of groups of bus capacitors is decreased and circuit design complexity is reduced. In addition, each switching transistor branch includes two half bridges, and a common terminal of the two half bridges is grounded. This can ensure that a dropout voltage of the switching transistors is reduced and that a component with a relatively low voltage withstand grade can be used in the circuit.

In an implementation, a third half bridge and a fourth half bridge are separately connected between an output terminal of the first negative coupled inductor and an output terminal of the second negative coupled inductor.

In an implementation, two switching transistors in the first half bridge and two switching transistors in the second half bridge in each switching transistor branch, and switching transistors forming the third half bridge and the fourth half bridge are insulated-gate bipolar transistors (IGBTs) that have a diode inside or metal-oxide-semiconductor field effect transitors (MOSFETs).

In an implementation, a clamping diode is further connected between the output terminal of the first negative coupled inductor and a terminal, not connected to the second capacitor, of the first capacitor; and a clamping diode is further connected between the output terminal of the second negative coupled inductor and a terminal, not connected to the first capacitor, of the second capacitor.

A second aspect of this application provides a three-phase multi-level circuit, including: a capacitance branch including a first capacitor and a second capacitor that are connected in series, a first multi-level generation unit, a second multi-level generation unit, a first inverter unit, a second inverter unit, a first power inductor, a second power inductor, and a third power inductor, where a common terminal of the first capacitor and the second capacitor is grounded; the first multi-level generation unit and the second multi-level generation unit each include: at least two switching transistor branches that are connected in parallel to the capacitance branch, a first negative coupled inductor, and a second negative coupled inductor, where each switching transistor branch includes a first half bridge and a second half bridge, and a common terminal of the first half bridge and the second half bridge of each switching transistor branch is grounded; each input terminal of the first negative coupled inductor is connected to a common terminal of two switching transistors in the first half bridge of only one of the switching transistor branches; and each input terminal of the second negative coupled inductor is connected to a common terminal of two switching transistors in the second half bridge of only one of the switching transistor branches; the first inverter unit includes: a third half bridge and a fourth half bridge that are separately connected between the first negative coupled inductor and the second negative coupled inductor in the first multi-level generation unit; the second inverter unit includes: a third half bridge and a fourth half bridge that are separately connected between the first negative coupled inductor and the second negative coupled inductor in the second multi-level generation unit; the first power inductor is connected to a common terminal of two switching transistors in the fourth half bridge in the first inverter unit; the second power inductor is separately connected to a common terminal of two switching transistors in the third half bridge in the first inverter unit, and a common terminal of the fourth half bridge in the second inverter unit; and the third power inductor is connected to a common terminal of the third half bridge in the second inverter unit.

It can be learned from the foregoing process that two groups of bus capacitors are disposed in the three-phase multi-level circuit, so that a quantity of groups of bus capacitors is decreased and circuit design complexity is reduced. In addition, each switching transistor branch includes two half bridges, and a common terminal of the two half bridges is grounded. This can ensure that a dropout voltage of the switching transistors is reduced and that a component with a relatively low voltage withstand grade can be used in the circuit.

In an implementation, two switching transistors in the first half bridge and two switching transistors in the second half bridge in each switching transistor branch of the first multi-level generation unit and the second multi-level generation unit, and the switching transistors in the third half bridges and the fourth half bridges of the first inverter unit and the second inverter unit are IGBTs that have a diode inside or MOSFETs.

In an implementation, a clamping diode is further connected between an output terminal of the first negative coupled inductor in each of the first multi-level generation unit and the second multi-level generation unit and a terminal, not connected to the second capacitor, of the first capacitor; and a clamping diode is further connected between an output terminal of the second negative coupled inductor in each of the first multi-level generation unit and the second multi-level generation unit and a terminal, not connected to the first capacitor, of the second capacitor.

In an implementation, a ground terminal of the three-phase multi-level circuit is further configured to connect to a common terminal of an external three-phase power source, to act as a ground cable of the three-phase power source.

A third aspect of this application provides a multi-level circuit control method, applied to any one of the multi-level circuits disclosed in the foregoing first aspect. The control method includes: controlling, in each switching transistor branch, two switching transistors in the first half bridge to emit pulses complementarily, and two switching transistors in the second half bridge to emit pulses complementarily; controlling, in two adjacent switching transistor branches, first switching transistors in first half bridges to emit pulses alternately with a phase difference of N degrees, and second switching transistors in second half bridges to emit pulses alternately with a phase difference of N degrees, where N is a result of dividing 360 by a quantity of switching transistor branches; and controlling two switching transistors in the third half bridge to emit pulses complementarily, and two switching transistors in the fourth half bridge to emit pulses complementarily.

A fourth aspect of this application provides a three-phase multi-level circuit control method, applied to any one of the three-phase multi-level circuits disclosed in the second aspect. The control method includes:

controlling, in each switching transistor branch of the first multi-level generation unit, two switching transistors in the first half bridge to emit pulses complementarily, and two switching transistors in the second half bridge to emit pulses complementarily, and controlling, in two adjacent switching transistor branches, first switching transistors in first half bridges to emit pulses alternately with a phase difference of N degrees, and second switching transistors in second half bridges to emit pulses alternately with a phase difference of N degrees, where N is a result of dividing 360 by a quantity of switching transistor branches; controlling, in each switching transistor branch of the second multi-level generation unit, two switching transistors in the first half bridge to emit pulses complementarily, and two switching transistors in the second half bridge to emit pulses complementarily, and controlling, in two adjacent switching transistor branches, first switching transistors in first half bridges to emit pulses with a phase difference of N degrees, and second switching transistors in second half bridges to emit pulses with a phase difference of N degrees, where N is a result of dividing 360 by a quantity of switching transistor branches; controlling, in the first inverter unit, two switching transistors in the third half bridge to emit pulses complementarily, and two switching transistors in the fourth half bridge to emit pulses complementarily; and controlling, in the second inverter unit, two switching transistors in the third half bridge to emit pulses complementarily, and two switching transistors in the fourth half bridge to emit pulses complementarily.

In an implementation, the three-phase multi-level circuit control method further includes:

in a range of 0-60 degrees, controlling a first switching transistor in the fourth half bridge in the first inverter circuit, a second switching transistor in the third half bridge in the second inverter circuit, and a first switching transistor in the fourth half bridge in the second inverter circuit to be turned on;

in a range of 60-120 degrees, controlling a second switching transistor in the third half bridge in the first inverter circuit, the first switching transistor in the fourth half bridge in the first inverter circuit, and the second switching transistor in the third half bridge in the second inverter circuit to be turned on;

in a range of 120-180 degrees, controlling the second switching transistor in the third half bridge in the first inverter circuit, the first switching transistor in the fourth half bridge in the first inverter circuit, and a first switching transistor in the third half bridge in the second inverter circuit to be turned on; or controlling the first switching transistor in the fourth half bridge in the first inverter circuit, a first switching transistor in the third half bridge in the second inverter circuit, and a second switching transistor in the fourth half bridge in the second inverter circuit to be turned on;

in a range of 180-240 degrees, controlling a second switching transistor in the fourth half bridge in the first inverter circuit, the first switching transistor in the third half bridge in the second inverter circuit, and the second switching transistor in the fourth half bridge in the second inverter circuit to be turned on;

in a range of 240-300 degrees, controlling the second switching transistor in the fourth half bridge in the first inverter circuit, a first switching transistor in the third half bridge in the first inverter circuit, and the first switching transistor in the third half bridge in the second inverter circuit to be turned on; and in a range of 300-360 degrees, controlling the second switching transistor in the fourth half bridge in the first inverter circuit, the first switching transistor in the third half bridge in the first inverter circuit, and the second switching transistor in the third half bridge in the second inverter circuit to be turned on; or controlling the second switching transistor in the fourth half bridge in the first inverter circuit, the first switching transistor in the third half bridge in the second inverter circuit, and the second switching transistor in the third half bridge in the second inverter circuit to be turned on.

DESCRIPTION OF EMBODIMENTS

The following clearly describes the technical solutions in the embodiments of the present disclosure with reference to the accompanying drawings in the embodiments of the present disclosure.

Figure 1:
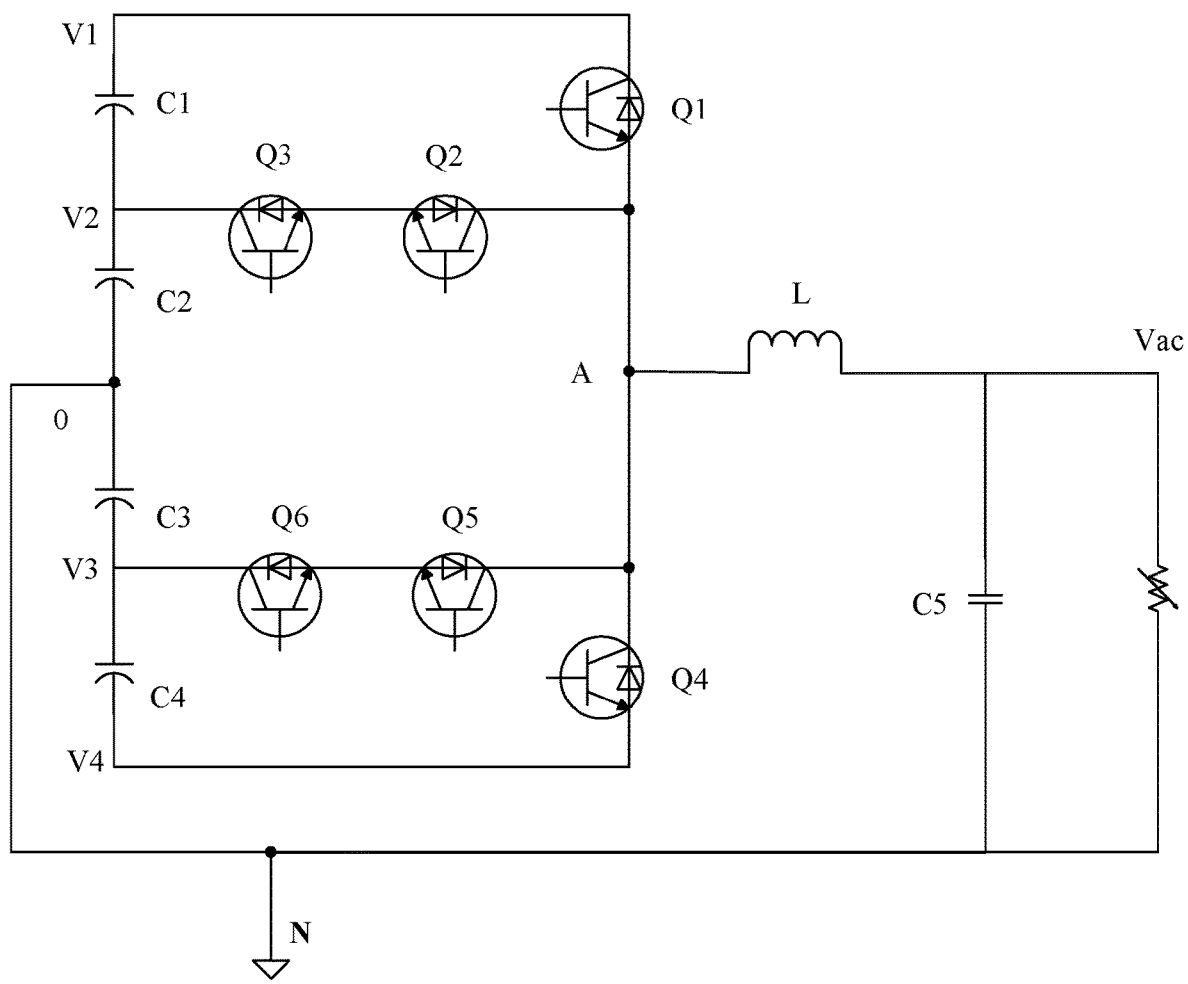
FIG. 1 is a topological diagram of a four-level circuit disclosed in the prior art.
Figure 2:
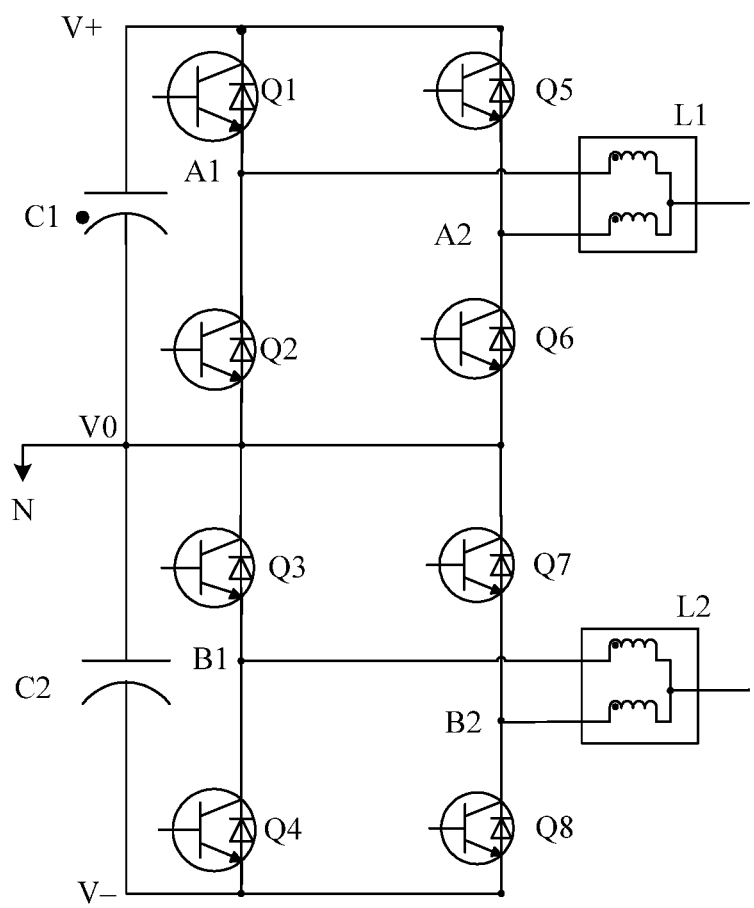
FIG. 2 is a topological diagram of a five-level circuit according to an embodiment of this application.
Figure 3:
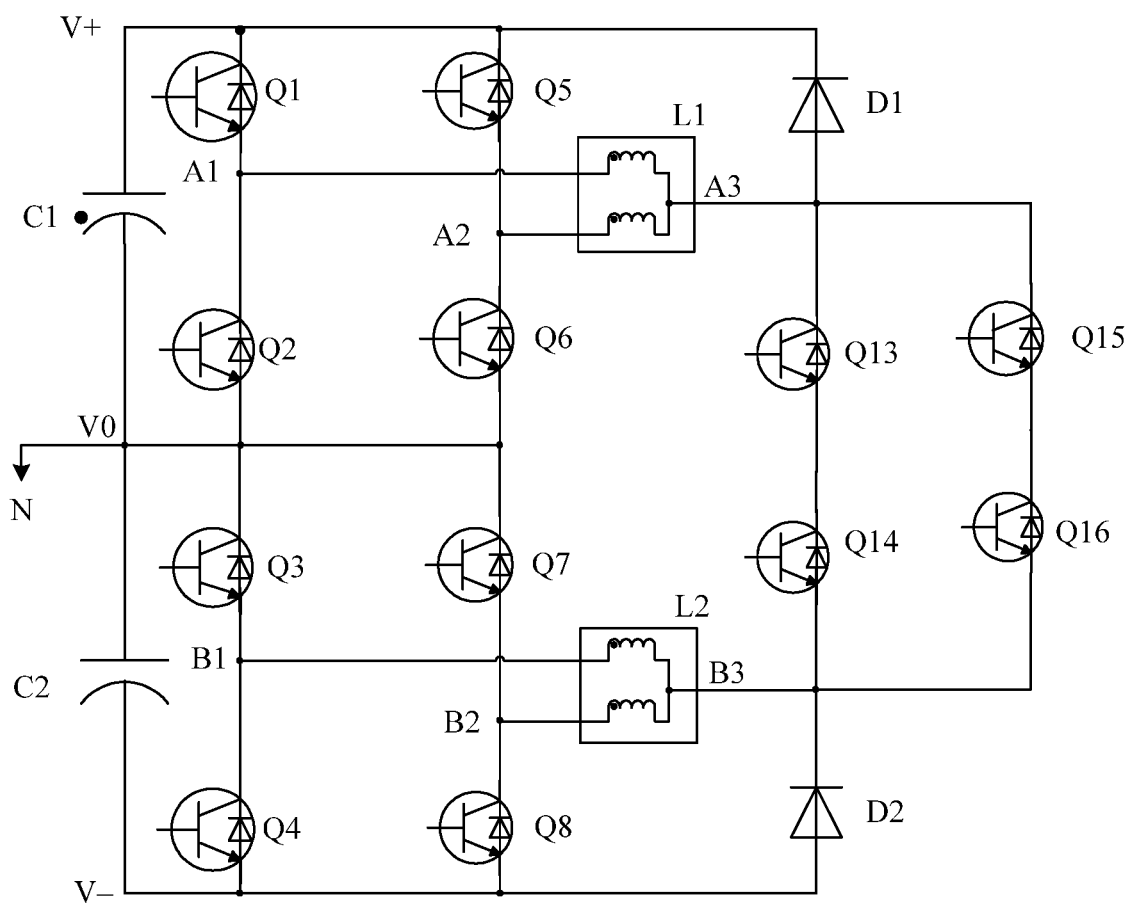
FIG. 3 is a topological diagram of a five-level circuit according to an embodiment of this application.

An embodiment of this application discloses a five-level circuit. Referring to FIG. 2 and FIG. 3, the five-level circuit includes:

a capacitor C1, a capacitor C2, a switching transistor Q1 to a switching transistor Q8, a switching transistor Q13 to a switching transistor Q16, a coupled inductor L1, and a coupled inductor L2.

The capacitor C1 and the capacitor C2 are bus capacitors on a direct current side that are connected in series to form a capacitance branch, and a common terminal of the capacitor C1 and the capacitor C2 is grounded. Optionally, the capacitor C1 and the capacitor C2 may be electrolytic capacitors, or may be capacitors of another type. In addition, the capacitor C1 and the capacitor C2 each may be designed as a capacitor with a relatively large capacitance value, or may be designed as several capacitors connected in parallel. Based on this, it can be learned that, regardless of whether the capacitor C1 and the capacitor C2 each are designed as a capacitor with a large capacitance value or several capacitors connected in parallel, there are only two groups of bus capacitors. This reduces a quantity of groups of bus capacitors and reduces circuit design complexity.

The switching transistor Q1 to the switching transistor Q4 are connected in series to form a first switching transistor branch, where the switching transistor Q1 and the switching transistor Q2 form a first half bridge, the switching transistor Q3 and the switching transistor Q4 form a second half bridge, and a common terminal of the first half bridge and the second half bridge is grounded, that is, a common terminal of the switching transistor Q2 and the switching transistor Q3 is grounded. The switching transistor Q5 to the switching transistor Q8 are connected in series to form a second switching transistor branch, where the switching transistor Q5 and the switching transistor Q6 form a first half bridge, the switching transistor Q7 and the switching transistor Q8 form a second half bridge, and a common terminal of the first half bridge and the second half bridge is grounded, that is, a common terminal of the switching transistor Q6 and the switching transistor Q7 is grounded. The first switching transistor branch and the second switching transistor branch are separately connected in parallel to the capacitance branch. It should be further noted that the first switching transistor branch and the second switching transistor branch each include the first half bridge and the second half bridge, as shown in FIG. 2; or both the first switching transistor branch and the second switching transistor branch include either the first half bridge or the second half bridge, in other words, a total quantity of the first half bridges in the first switching transistor branch and the second switching transistor branch is different from a total quantity of the second half bridges in the first switching transistor branch and the second switching transistor branch.

Both the coupled inductor L1 and the coupled inductor L2 are negative coupled inductors, and may be designed to have an extremely low leakage inductance. A first input terminal A1 of the coupled inductor L1 is connected to a common terminal of the switching transistor Q1 and the switching transistor Q2, and a second input terminal A2 is connected to a common terminal of the switching transistor Q5 and the switching transistor Q6. Optionally, referring to FIG. 3, an output terminal A3 of the coupled inductor L1 may be further connected through a clamping diode D1 to a terminal, not connected to the capacitor C2, of the capacitor C1, to clamp a voltage peak. A first input terminal B1 of the coupled inductor L2 is connected to a common terminal of the switching transistor Q3 and the switching transistor Q4, and a second input terminal B2 is connected to a common terminal of the switching transistor Q7 and the switching transistor Q8. Similarly, optionally, referring to FIG. 3, an output terminal B3 of the coupled inductor L2 may be further connected through a clamping diode D2 to a terminal, not connected to the capacitor C1, of the capacitor C2, to clamp a voltage peak.

Referring to FIG. 3, the switching transistor Q13 and the switching transistor Q14 form a third half bridge that is connected between the output terminal A3 of the coupled inductor L1 and the output terminal B3 of the coupled inductor L2. Similarly, the switching transistor Q15 and the switching transistor Q16 form a fourth half bridge that is also connected between the output terminal A3 of the coupled inductor L1 and the output terminal B3 of the coupled inductor L2.

Optionally, IGBTs having a diode inside or MOSFETs may be used as the switching transistor Q1 to the switching transistor Q8 and the switching transistor Q13 to the switching transistor Q16.

In the five-level circuit disclosed in this embodiment, there are three electric potentials V+, V0, and V− on a direct current side, and because the coupled inductor L1 is a negative coupled inductor, an electric potential of the output terminal A3 of the coupled inductor L1 is half a sum of electric potentials of the input terminal A1 and the input terminal A2, that is, VA3=(VA1+VA2)/2. In addition, the switching transistor Q1 and the switching transistor Q2 form a bridge arm of one half bridge, and the two switching transistors emit pulses complementarily. The switching transistor Q5 and the switching transistor Q6 also form a bridge arm of one half bridge, and the two switching transistors also emit pulses complementarily. In addition, the switching transistor Q1 and the switching transistor Q5 emit pulses alternately with a phase difference of 180 degrees (staggered by half a switching cycle). On this basis, when the switching transistor Q1 and the switching transistor Q5 are turned on, both voltages at the point A1 and the point A2 are at an electric potential of V+, and the electric potential of the point A3 is V+. When the switching transistor Q1 is turned on and the switching transistor Q5 is turned off, or when the switching transistor Q1 is turned off and the switching transistor Q5 is turned on, the electric potential of the point A3 is V+/2. When both the switching transistor Q1 and the switching transistor Q5 are turned off, the electric potential of the point A3 is 0, and three electrical levels V+, V+/2, and 0 are formed at the point A3.

Figure 4A:
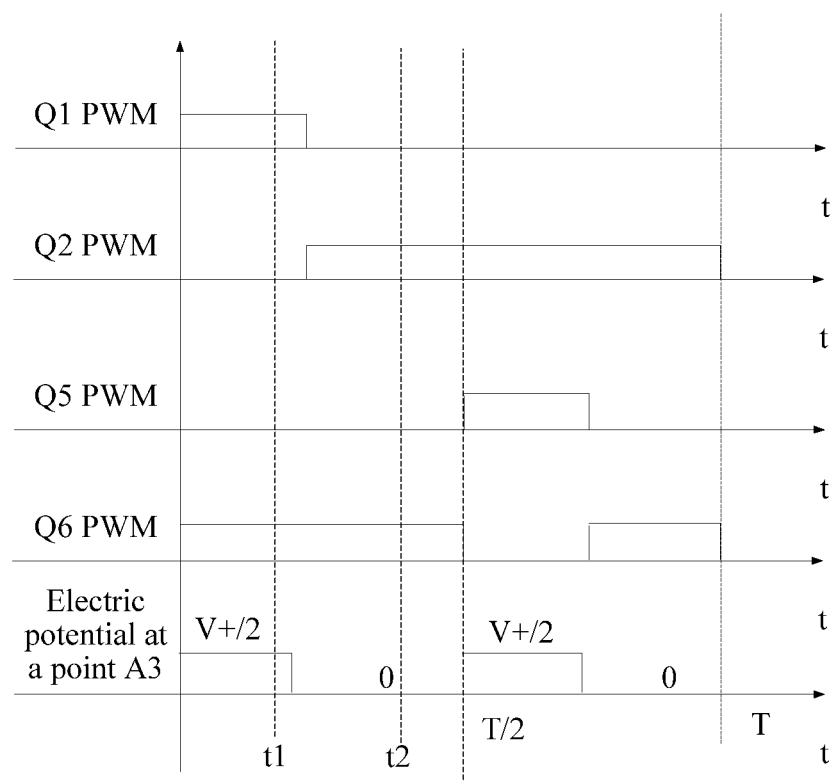
FIG. 4(a) is a diagram displaying electric potentials of switching transistors Q1, Q2, Q5, and Q6 and a point A3 when a duty cycle of the switching transistor Q1 and a switching transistor Q5 are less than 50%.

It is assumed that all the switching transistors are turned on at a high electrical level, and are turned off at a low electrical level. Referring to FIG. 4(a), when a duty cycle of the switching transistor Q1 and the switching transistor Q5 is less than 50%, at a time point t1, the switching transistor Q1 is at a high electrical level, the switching transistor Q2 is at a low electrical level, the switching transistor Q5 is at a low electrical level, and the switching transistor Q6 is at a high electrical level. Therefore, at the time point t1, the switching transistor Q1 is turned on, the switching transistor Q5 is turned off, and the electrical potential of the point A3 is V+/2. At a time point of t2, the switching transistor Q1 is at a low electrical level, the switching transistor Q2 is at a high electrical level, the switching transistor Q5 is at a low electrical level, and the switching transistor Q6 is at a high electrical level. Therefore, both the switching transistor Q1 and the switching transistor Q5 are turned off, and the electrical potential of the point A3 is 0.

Figure 4B:
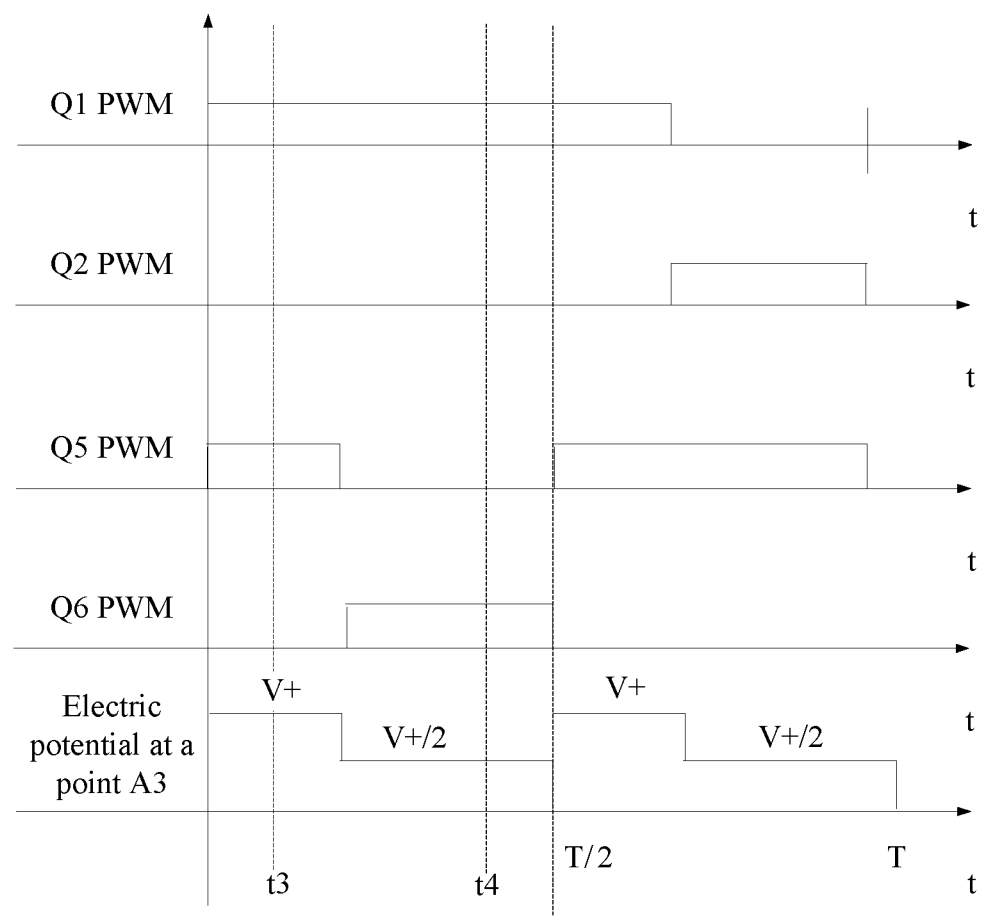
FIG. 4(b) is a diagram displaying electric potentials of switching transistors Q1, Q2, Q5, and Q6 and a point A3 when a duty cycle of the switching transistor Q1 and a switching transistor Q5 are greater than 50%.

Further referring to FIG. 4(b), when a duty cycle of the switching transistor Q1 and the switching transistor Q5 is greater than 50%, at a time point t3, the switching transistor Q1 is at a high electrical level, the switching transistor Q2 is at a low electrical level, the switching transistor Q5 is at a high electrical level, and the switching transistor Q6 is at a low electrical level. Therefore, at the time point t3, both the switching transistor Q1 and the switching transistor Q5 are turned on, and the electrical potential of the point A3 is V+. At a time point of t4, the switching transistor Q1 is at a high electrical level, the switching transistor Q2 is at a low electrical level, the switching transistor Q5 is at a low electrical level, and the switching transistor Q6 is at a high electrical level. Therefore, the switching transistor Q1 is turned on, the switching transistor Q5 is turned off, and the electrical potential of the point A3 is V+/2.

Similarly, an electric potential of the output terminal B3 of the coupled inductor L2 is half a sum of electric potentials of the input terminal B1 and the input terminal B2, that is, VB3=(VB1+VB2)/2. The switching transistor Q3 and the switching transistor Q4 emit pulses complementarily, the switching transistor Q7 and the switching transistor Q8 emit pulses complementarily, the switching transistor Q3 and the switching transistor Q7 emit pulses alternately with a phase difference of 180 degrees, and three electrical levels V−, V−/2, and 0 are formed at the point B3.

It should be noted that a common terminal of the switching transistor Q13 and the switching transistor Q14 acts as an output terminal of the five-level circuit, and a common terminal of the switching transistor Q15 and the switching transistor Q16 acts as another output terminal of the five-level circuit. If the switching transistor Q13 is turned on and the switching transistor Q14 is turned off, three electrical levels V+, V+/2, and 0 can be output; and if the switching transistor Q13 is turned off and the switching transistor Q14 is turned on, three electrical levels V+, V+/2, and 0 can be output. Similarly, if the switching transistor Q15 is turned on and the switching transistor Q16 is turned off, three electrical levels V+, V+/2, and 0 can be output; and if the switching transistor Q16 is turned on and the switching transistor Q15 is turned off, three electrical levels V−, V−/2, and 0 can be output. Therefore, totally five electrical levels V+, V+/2, 0, V−/2, and V− can be output.

It should be further noted that in the five-level circuit disclosed in this embodiment, the switching transistor Q1 and the switching transistor Q2 form the half bridge and an output terminal of the switching transistor is grounded. Therefore, if the switching transistor Q1 is turned on, a voltage of an input terminal of the switching transistor Q2 is V+, a voltage of an output terminal of the switching transistor Q2 is 0, and a dropout voltage of the switching transistor Q2 is V+; and if the switching transistor Q1 is turned off and the switching transistor Q2 is turned on, a voltage of an input terminal of the switching transistor Q1 is V+, a voltage of an output terminal of the switching transistor Q1 is 0, and a dropout voltage of the switching transistor Q1 is also V+. For a bus voltage around 400 V, if a peak voltage upon turn-off is also considered, the switching transistor Q1 and the switching transistor Q2 each may use a component with a voltage withstand grade of only 600 V. Similarly, the switching transistor Q5 and the switching transistor Q6 may also use a component of a relatively low voltage withstand grade.

In addition, the switching transistor Q3 and the switching transistor Q4 also form the half bridge, and an input terminal of the switching transistor Q3 is also grounded. If the switching transistor Q4 is turned on, a voltage of an output terminal of the switching transistor Q3 is V−, a voltage of an input terminal of the switching transistor Q3 is 0, and a dropout voltage of the switching transistor Q3 is V−; and if the switching transistor Q3 is turned on and the switching transistor Q4 is turned off, a voltage of an input terminal of the switching transistor Q4 is 0, a voltage of an output terminal of the switching transistor Q4 is V−, and a dropout voltage of the switching transistor Q4 is V−. Similarly, when a bus voltage is around 400 V, the switching transistor Q3 and the switching transistor Q4 also need to use a component with a voltage withstand grade of only −600 V. Similarly, voltage withstand grades of the switching transistor Q7 and the switching transistor Q8 may also be relatively low.

Figure 5:
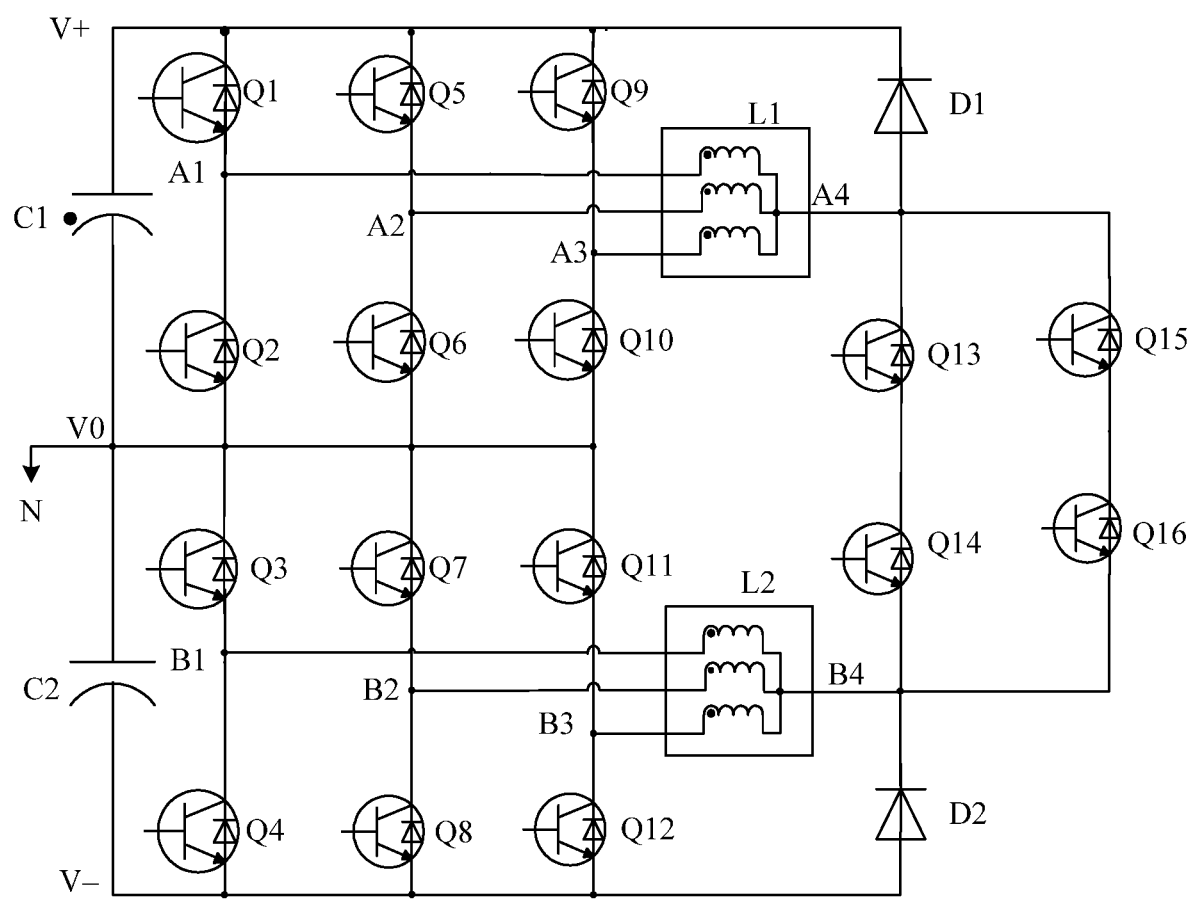
FIG. 5 is a topological diagram of a seven-level circuit according to an embodiment of this application.

Another embodiment of this application further discloses a seven-level circuit, including a capacitor C1, a capacitor C2, a switching transistor Q1 to a switching transistor Q12, a switching transistor Q13 to a switching transistor Q16, a coupled inductor L1, and a coupled inductor L2, as shown in FIG. 5.

A connection manner of the capacitor C1, the capacitor C2, the switching transistor Q1 to the switching transistor Q8, and the switching transistor Q13 to the switching transistor Q16 is the same as that of the five-level circuit disclosed in the foregoing embodiment. Reference may be made to the content of the foregoing embodiment, and details are not described herein again.

Different from the five-level circuit, the seven-level circuit disclosed in this embodiment further includes: a switching transistor branch including the switching transistor Q9 to the switching transistor Q12, which is referred to as a third switching transistor branch herein. The switching transistor branch is also connected in parallel to a capacitance branch including the capacitor C1 and the capacitor C2. In addition, in the third switching transistor branch, the switching transistor Q9 and the switching transistor Q10 form a first half bridge, the switching transistor Q11 and the switching transistor Q12 form a second half bridge, a common terminal of the first half bridge and the second half bridge is grounded, that is, a common terminal of the switching transistor Q10 and the switching transistor Q11 is grounded.

The seven-level circuit includes three switching transistor branches, and therefore the coupled inductor L1 and the coupled inductor L2 each include three input terminals, and each input terminal is only connected to a common terminal of two switching transistors of the first half bridge or the second half bridge of only one switching transistor branch. An input terminal A1 of the coupled inductor L1 is connected to a common terminal of the switching transistor Q1 and the switching transistor Q2, an input terminal A2 is connected to a common terminal of the switching transistor Q5 and the switching transistor Q6, and an input terminal A3 is connected to a common terminal of the switching transistor Q9 and the switching transistor Q10. An input terminal B1 of the coupled inductor L2 is connected to a common terminal of the switching transistor Q3 and the switching transistor Q4, an input terminal B2 is connected to a common terminal of the switching transistor Q7 and the switching transistor Q8, and an input terminal B3 is connected to a common terminal of the switching transistor Q11 and the switching transistor Q12. A connection manner of output terminals of the coupled inductor L1 and the coupled inductor L2 is the same as that in the five-level circuit disclosed in the foregoing embodiment. Details are not described herein again.

In the seven-level circuit disclosed in this embodiment, there are also three electric potentials V+, V0, and V− on a direct current side. An electric potential of an output terminal A4 of the coupled inductor L1 is one third of a sum of electric potentials of the input terminal A1, the input terminal A2, and the input terminal A3, that is, VA4=(VA1+VA2+VA3)/3.

The switching transistor Q1 and the switching transistor Q2 form a bridge arm of one half bridge, and the two switching transistors emit pulses complementarily. The switching transistor Q5 and the switching transistor Q6 also form a bridge arm of one half bridge, and the two switching transistors also emit pulses complementarily. The switching transistor Q9 and the switching transistor Q10 also form a bridge arm of one half bridge, and the two switching transistors also emit pulses complementarily. In addition, the switching transistor Q1 and the switching transistor Q5 emit pulses alternately with a phase difference of 120 degrees, and the switching transistor Q5 and the switching transistor Q9 emit pulses alternately with a phase difference of 120 degrees. Based on this, if the switching transistor Q1, the switching transistor Q5, and the switching transistor Q9 are all turned on, voltages at the points A1, A2, and A3 are all V+ electric potential, and an electric potential at the point A4 is V+; if any one of the switching transistor Q1, the switching transistor Q5, and the switching transistor Q9 is turned on, and the other two are turned off, an electric potential at the point A3 is V+/3; if any two of the switching transistor Q1, the switching transistor Q5, and the switching transistor Q9 are turned on, and the other one is turned off, the electric potential at the point A3 is 2V+/3; and if the switching transistor Q1, the switching transistor Q5, and the switching transistor Q9 are all turned off, the electric potential at the point A3 is 0. Therefore, four electric potentials V+, V+/3, 2V+/3, and 0 are formed at the point A3.

Similarly, an electric potential of an output terminal B4 of the coupled inductor L2 is one third of a sum of electric potentials of the input terminal B1, the input terminal B2, and the input terminal B3, that is, VB4=(VB1+VB2+VB3)/3. The switching transistor Q3 and the switching transistor Q4 emit pulses complementarily, the switching transistor Q7 and the switching transistor Q8 emit pulses complementarily, the switching transistor Q11 and the switching transistor Q12 emit pulses complementarily, the switching transistor Q3 and the switching transistor Q7 emit pulses alternately with a phase difference of 120 degrees, and the switching transistor Q7 and the switching transistor Q11 emit pulses alternately with a phase difference of 120 degrees. Therefore, four electric potentials V−, V−/3, 2V−/3, and 0 are formed at the point B3.

Identical with that in the five-level circuit disclosed in the foregoing embodiment, a common terminal of the switching transistor Q13 and the switching transistor Q14 also acts as an output terminal of the seven-level circuit, and a common terminal of the switching transistor Q15 and the switching transistor Q16 acts as the other output terminal of the seven-level circuit. If the switching transistor Q13 is turned on and the switching transistor Q14 is turned off, four electrical levels V+, V+/3, 2V+/3, and 0 can be output; and if the switching transistor Q13 is turned off and the switching transistor Q14 is turned on, four electrical levels V−, V−/3, 2V−/3, and 0 can be output. Similarly, if the switching transistor Q15 is turned on and the switching transistor Q16 is turned off, four electrical levels V+, V+/3, 2V+/3, and 0 can be output; and if the switching transistor Q16 is turned on and the switching transistor Q15 is turned off, four electrical levels V−, V−/3, 2V−/3, and 0 can be output. Therefore, totally seven electrical levels V+, V+/3, 2V+/3, V−, V−/3, 2V−/3, and 0 are output.

From the five-level circuit and the seven-level circuit disclosed in the foregoing two embodiments, it can be learned that:

On a basis of the five-level circuit, one switching transistor branch is added, and an input terminal of a coupling inductor corresponding to the switching transistor branch is added, to implement a seven-level output. By analogy, on a basis of the five-level circuit, two switching transistor branches and input terminals of two coupling inductors are added, to implement a nine-level circuit output; and three switching transistor branches and input terminals of three coupling inductors are added, to implement an 11-level output. Therefore, it can be learned that, by controlling a quantity of switching transistor branches connected in parallel to a capacitance branch and setting a quantity of input terminals of a coupled inductor based on the quantity of switching transistor branches, different quantities of levels can be output, thereby forming multi-level circuits outputting the different quantities of levels.

It should be further noted that in each of the formed multi-level circuits, because there are only two groups of bus capacitors, a quantity of groups of bus capacitors is decreased and circuit design complexity is reduced. In addition, each switching transistor branch includes two half bridges, and a common terminal of the two half bridges is grounded. This can ensure that a dropout voltage of switching transistors is reduced and that a component with a relatively low voltage withstand grade can be used in the circuit.

Figure 6:
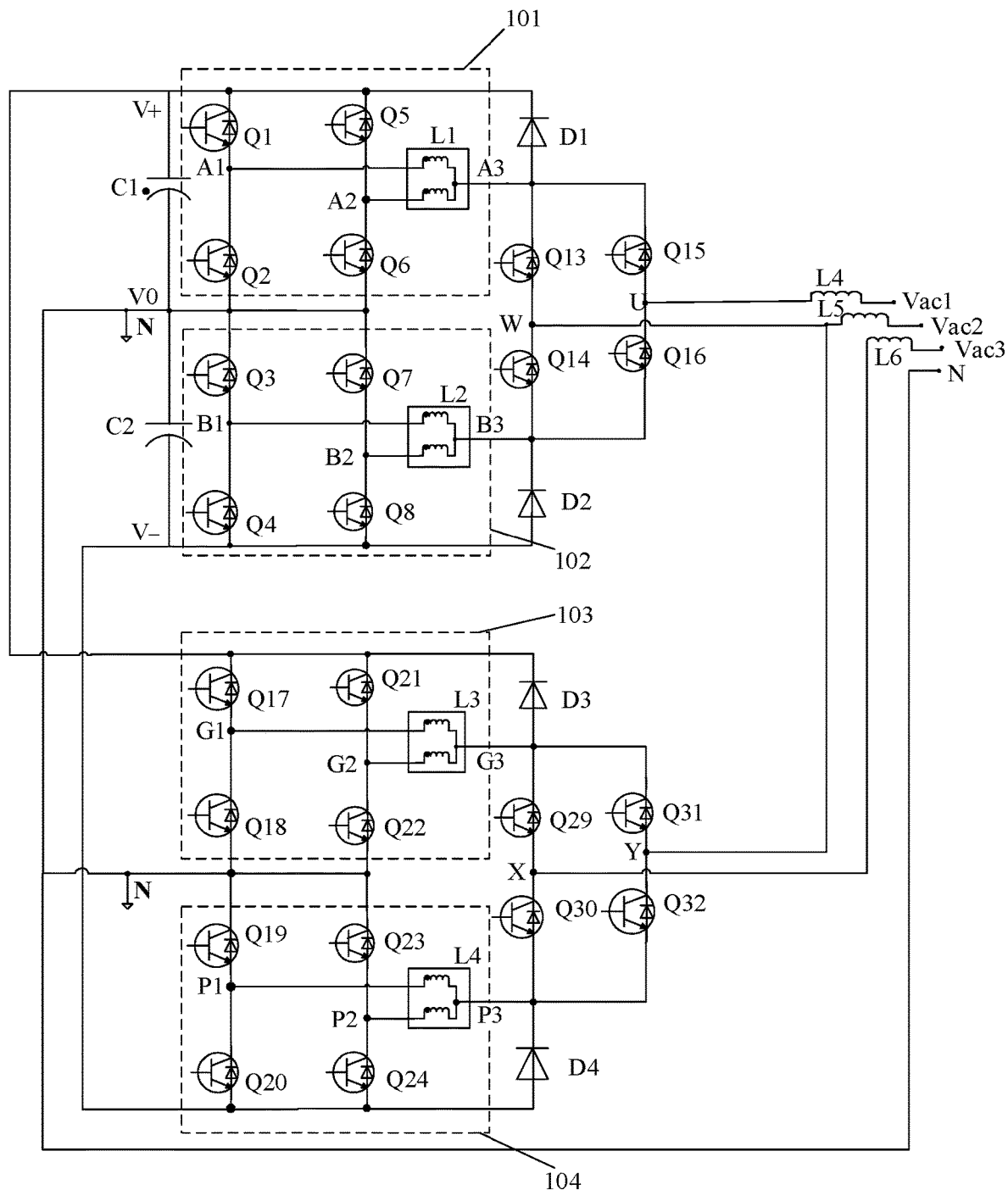
FIG. 6 is a topological diagram of a three-phase five-level circuit according to an embodiment of this application.

Another embodiment of this application further discloses a three-phase five-level circuit. Referring to FIG. 6, the circuit includes:

a capacitor C1, a capacitor C2, a switching transistor Q1 to a switching transistor Q8, a switching transistor Q13 to a switching transistor Q16, a coupled inductor L1, a coupled inductor L2, a switching transistor Q17 to a switching transistor Q24, a switching transistor Q29 to a switching transistor Q32, a coupled inductor L3, a coupled inductor L4, a power inductor L4, a power inductor L5, and a power inductor L6.

The power inductor L4, the power inductor L5, and the power inductor L6 are used for filtering. A connection manner of the capacitor C1, the capacitor C2, the switching transistor Q1 to the switching transistor Q8, the switching transistor Q13 to the switching transistor Q16, the coupled inductor L1, and the coupled inductor L2 is the same as that of the five-level circuit disclosed in the embodiment corresponding to FIG. 2. Details are not described herein again. In addition, for a connection manner of the switching transistor Q17 to the switching transistor Q24, the switching transistor Q29 to the switching transistor Q32, the coupled inductor L3, and the coupled inductor L4, refer to the connection manner of the switching transistor Q1 to the switching transistor Q8, the switching transistor Q13 to the switching transistor Q16, the coupled inductor L1, and the coupled inductor L2. Details are not described herein again.

It should be noted that a common terminal W of the switching transistor Q13 and the switching transistor Q14, a common terminal U of the switching transistor Q15 and the switching transistor Q16, a common terminal X of the switching transistor Q29 and the switching transistor Q30, and a common terminal Y of the switching transistor Q31 and the switching transistor Q32 act as output terminals to connect to the power inductor L4, the power inductor L5, and the power inductor L6. For example, the common terminal W of the switching transistor Q13 and the switching transistor Q14 is connected to a first terminal of the power inductor L5, the common terminal U of the switching transistor Q15 and the switching transistor Q16 is connected to a first terminal of the power inductor L4, the common terminal X of the switching transistor Q29 and the switching transistor Q30 is connected to a first terminal of the power inductor L6, the common terminal Y of the switching transistor Q31 and the switching transistor Q32 is connected to the first terminal of the power inductor L5, second terminals of the power inductor L4, the power inductor L5, and the power inductor L6 are used for power output or input, a power source of the power inductor L4 is Vac1, a power supply of the power inductor L5 is Vac2, and a power supply of the power inductor L6 is Vac3.

The common terminal W of the switching transistor Q13 and the switching transistor Q14, the common terminal U of the switching transistor Q15 and the switching transistor Q16, the common terminal X of the switching transistor Q29 and the switching transistor Q30, and the common terminal Y of the switching transistor Q31 and the switching transistor Q32 may be connected to the power inductor L4, the power inductor L5, and the power inductor L6 in other manners. Details are not described herein. The following content is described based only on the connection manner shown in FIG. 6.

It should be further noted that a ground terminal in the three-phase five-level circuit may be led out as a ground cable, or may not be led out, to meet requirements in different scenarios.

Figure 7:
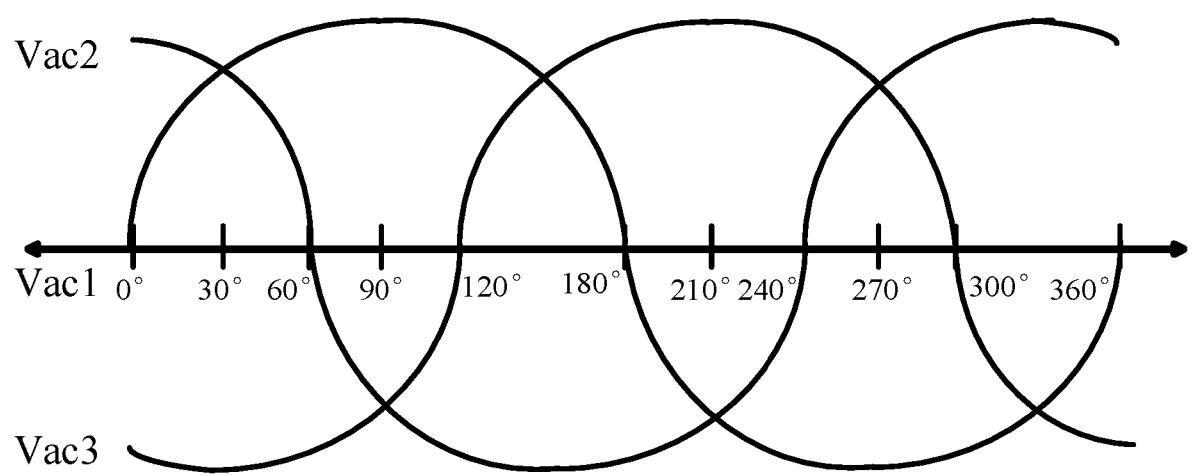
FIG. 7 is a diagram displaying a three-phase alternating current according to an embodiment of this application.

With reference to FIG. 6 and FIG. 7, phase differences between the three-phase voltages Vac1, Vac2, and Vac3 are all 120 degrees. To meet this requirement, the switching transistor Q13, the switching transistor Q14, the switching transistor Q15, the switching transistor Q16, the switching transistor Q29, the switching transistor Q30, the switching transistor Q31, and the switching transistor Q32 need to be adjusted to on or off. In addition, depending on on/off states of the switching transistor Q13, the switching transistor Q14, the switching transistor Q15, switching transistor Q16, the switching transistor Q29, the switching transistor Q30, the switching transistor Q31, and the switching transistor Q32, working statuses of a circuit 101, a circuit 102, a circuit 103, and a circuit 104 shown in a dashed box in FIG. 6 are adjusted correspondingly.

In a range of 0-60 degrees, Vac1 and Vac2 are positive voltages, and Vac3 is a negative voltage, and therefore Vac1, Vac2, and Vac3 flow through the circuit 101, the circuit 103, and the circuit 104, respectively. Correspondingly, among the switching transistor Q13, the switching transistor Q14, the switching transistor Q15, the switching transistor Q16, the switching transistor Q29, the switching transistor Q30, the switching transistor Q31, and the switching transistor Q32, the switching transistor Q15, the switching transistor Q30, and the switching transistor Q31 are turned on, and the others are turned off.

In a range of 60-120 degrees, Vac1 is a positive voltage, and Vac2 and Vac3 are negative voltages, and therefore Vac1, Vac2, and Vac3 flow through the circuit 101, the circuit 102, and the circuit 104, respectively. Correspondingly, among the switching transistor Q13, the switching transistor Q14, the switching transistor Q15, the switching transistor Q16, the switching transistor Q29, the switching transistor Q30, the switching transistor Q31, and the switching transistor Q32, the switching transistor Q15, the switching transistor Q30, and the switching transistor Q14 are turned on, and the others are turned off.

In a range of 120-180 degrees, Vac1 and Vac3 are positive voltages, and Vac2 is a negative voltage, and therefore Vac1 and Vac3 flow through the circuit 101 and the circuit 103, respectively, and Vac2 flows through the circuit 102 or the circuit 104. Correspondingly, among the switching transistor Q13, the switching transistor Q14, the switching transistor Q15, the switching transistor Q16, the switching transistor Q29, the switching transistor Q30, the switching transistor Q31, and the switching transistor Q32, the switching transistor Q15, the switching transistor Q29, and the switching transistor Q14 (or the switching transistor Q32) are turned on, and the others are turned off.

In a range of 180-240 degrees, Vac1 and Vac2 are negative voltages, and Vac3 is a positive voltage. Vac1 and Vac3 flow through the circuits 102 and 103, respectively, and Vac2 flows through the circuit 104. Therefore, the circuit 102, the circuit 103, and the circuit 104 work normally, and the circuit 101 does not work. Correspondingly, among the switching transistor Q13, the switching transistor Q14, the switching transistor Q15, the switching transistor Q16, the switching transistor Q29, the switching transistor Q30, the switching transistor Q31, and the switching transistor Q32, the switching transistor Q16, the switching transistor Q29, and the switching transistor Q32 are turned on, and the others are turned off.

In a range of 240-300 degrees, Vac2 and Vac3 are positive voltages and Vac1 is a negative voltage. Vac1 and Vac3 flow through the circuits 102 and 103, respectively, and Vac2 flows through the circuit 101. The circuit 102, the circuit 103, and the circuit 101 work normally, and the circuit 104 does not work. Correspondingly, among the switching transistor Q13, the switching transistor Q14, the switching transistor Q15, the switching transistor Q16, the switching transistor Q29, the switching transistor Q30, the switching transistor Q31, and the switching transistor Q32, the switching transistor Q16, the switching transistor Q29, the switching transistor Q13 are turned on, and the others are turned off.

In a range of 300-360 degrees, Vac1 and Vac3 are negative voltages, and Vac2 is a positive voltage. Vac1 and Vac3 flow through the circuits 102 and 104, respectively, and Vac2 flows through the circuit 101 or 103. The circuit 102, the circuit 104, and the circuit 101 (or the circuit 103) work normally, and the circuit 103 (or the circuit 101) does not work. Correspondingly, among the switching transistor Q13, the switching transistor Q14, the switching transistor Q15, the switching transistor Q16, the switching transistor Q29, the switching transistor Q30, the switching transistor Q31, and the switching transistor Q32, the switching transistor Q16, the switching transistor Q30, and the switching transistor Q13 (or the switching transistor Q29) are turned on, and the others are turned off.

It should be further noted that when the four circuits 101 to 104 switch to work, to avoid a problem of switching transistor overvoltage, the switching transistor Q1 to the switching transistor Q8, the switching transistor Q13 to the switching transistor Q16, the switching transistor Q17 to the switching transistor Q24, and the switching transistor Q29 to the switching transistor Q32 need to meet specific requirements.

Figure 8:
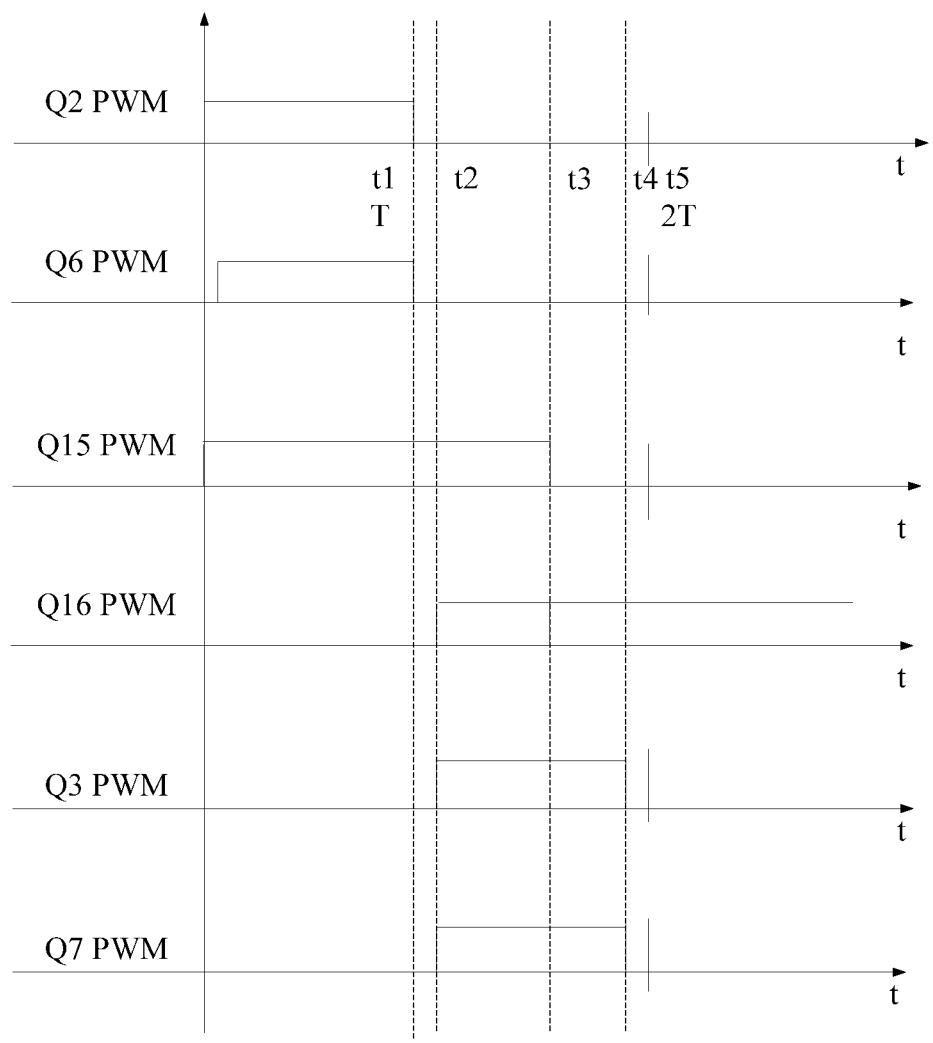
FIG. 8 is a diagram displaying electric potentials of switching transistors Q2, Q6, Q13, Q14, Q7, and Q11 when an operating circuit switches from a circuit 101 to a circuit 102 according to an embodiment of this application.

For example, when Vac1 needs to be switched from the circuit 101 to the circuit 102, referring to FIG. 8, the switching transistor Q15 needs to be turned off, and the switching transistor Q16 needs to be turned on instead. To ensure that no switching transistors are overvoltage during the switching, it is required that the switching transistor Q1 to the switching transistor Q8 should not emit pulses alternately in one cycle after zero-crossing. Specifically:

In a t1-t2 stage, both the switching transistor Q2 and the switching transistor Q6 are turned off.

In a t2-t3 stage, all the switching transistor Q3, the switching transistor Q7, and the switching transistor Q16 are all turned on.

At a time point t3, the switching transistor Q15 is turned off, and at this time, all positive half-cycle currents flow to a negative half-cycle path. The coupled inductor L2 only has a leakage inductance of 1-2 µH, and is clamped to a positive bus through a clamping diode D1, so that the switching transistor Q15 cannot be overvoltage.

At a time point t4, the switching transistor Q3 and the switching transistor Q7 are simultaneously turned off, to ensure magnetic balance of the coupled inductor in one cycle.

A time point t5 is a second switching cycle after zero-crossing. After the time point t5, the switching transistor Q1 to the switching transistor Q8 emit pulses alternately again.

Figure 9:
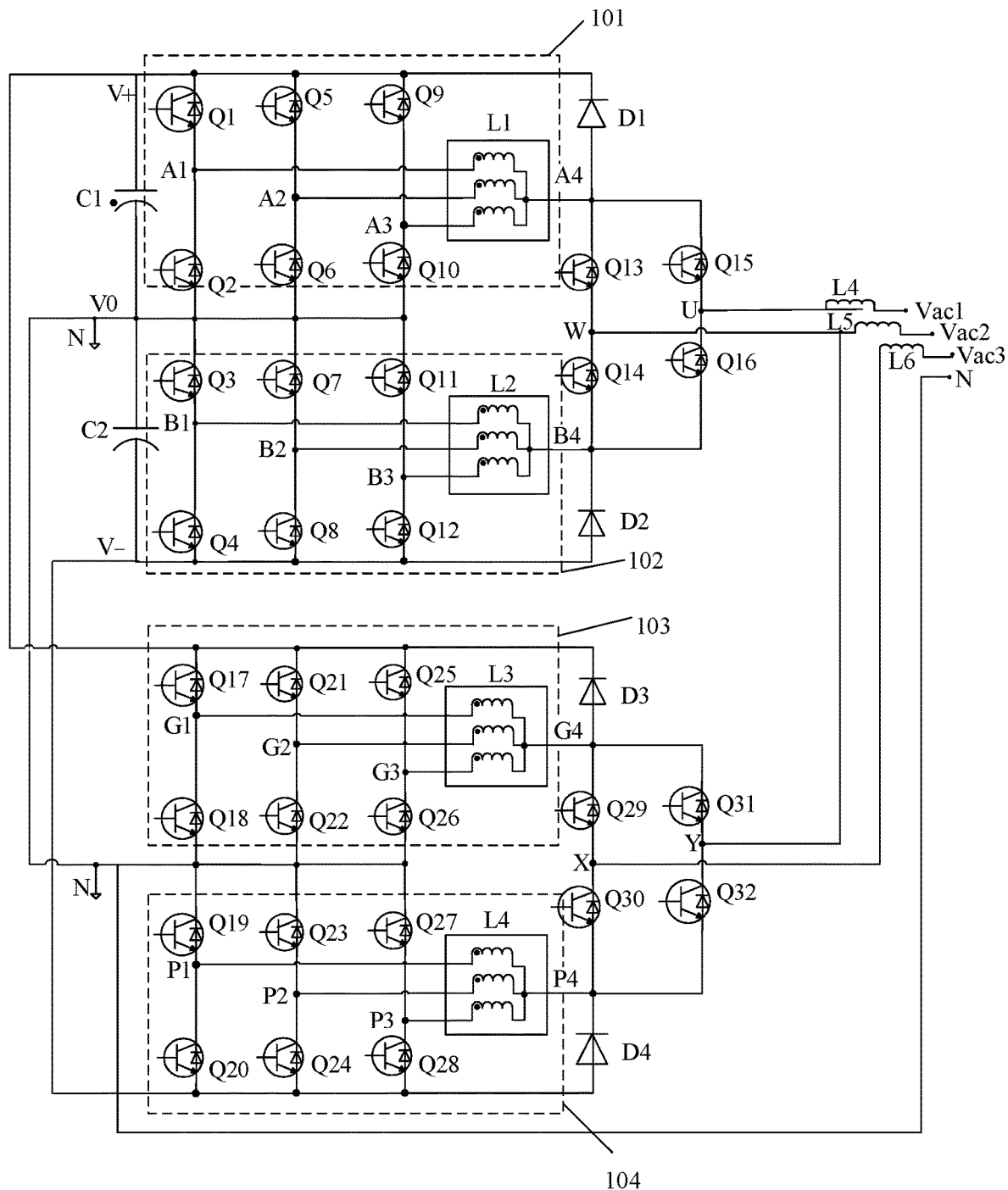
FIG. 9 is a topological diagram of a three-phase seven-level circuit according to an embodiment of this application.

Another embodiment of this application further discloses a three-phase seven-level circuit. Referring to FIG. 9, the circuit includes:

a capacitor C1, a capacitor C2, a switching transistor Q1 to a switching transistor Q12, a switching transistor Q13 to a switching transistor Q16, a coupled inductor L1, a coupled inductor L2, a switching transistor Q17 to a switching transistor Q28, a switching transistor Q29 to a switching transistor Q32, a coupled inductor L3, a coupled inductor L4, a power inductor L4, a power inductor L5, and a power inductor L6.

A connection manner of the capacitor C1, the capacitor C2, the switching transistor Q1 to the switching transistor Q12, the switching transistor Q13 to the switching transistor Q16, the coupled inductor L1, and the coupled inductor L2 is the same as that of the seven-level circuit disclosed in the embodiment corresponding to FIG. 5. Details are not described herein again. In addition, for a connection manner of the switching transistor Q17 to the switching transistor Q28, the switching transistor Q29 to the switching transistor Q32, the coupled inductor L3, and the coupled inductor L4, refer to the connection manner of the switching transistor Q1 to the switching transistor Q12, the switching transistor Q13 to the switching transistor Q16, the coupled inductor L1, and the coupled inductor L2. Details are not described herein again.

In addition, the switching transistor Q13 to the switching transistor Q16 and the switching transistor Q29 to the switching transistor Q32 also need to establish connections to the power inductor L4, the power inductor L5, and the power inductor L6, to output three-phase alternating currents Vac1, Vac2, and Vac3 by using a filtering function of the power inductor L4, the power inductor L5, and the power inductor L6. For specific content, refer to the content of the three-phase five-level circuit disclosed in the foregoing embodiment. Details are not described herein again.

It should be noted that different from the three-phase five-level circuit disclosed in the foregoing embodiment, in the three-phase seven-level circuit disclosed in this embodiment, a switching transistor circuit including the switching transistor Q9 to the switching transistor Q12 and a switching transistor branch including the switching transistor Q25 to the switching transistor Q28 are added to meet seven-level output. Correspondingly, when the circuit 101 to the circuit 104 switch to work, turn-on or turn-off of the switching transistors also needs to ensure no switching transistors are overvoltage during the switching, that is, it is required that the switching transistor Q1 to the switching transistor Q12 should not emit pulses in one cycle after zero-crossing. For details, refer to the content corresponding to FIG. 8. Details are not described herein again.

Another embodiment of this application further discloses a multi-level circuit control method, to control turn-on or turn-off of a switching transistor in a multi-level circuit. For a circuit topology of the multi-level circuit, refer to the content of the embodiments corresponding to FIG. 2 and FIG. 5. Details are not described herein again. In a working process of the multi-level circuit, the control method is used to:

control, in each switching transistor branch, two switching transistors in a first half bridge to emit pulses complementarily, and two switching transistors in a second half bridge to emit pulses complementarily; and control, in two adjacent switching transistor branches, first switching transistors in first half bridges to emit pulses alternately with a phase difference of N degrees, and second switching transistors in second half bridges to emit pulses alternately with a phase difference of N degrees, where N is a result of dividing 360 by a quantity of switching transistor branches; and control two switching transistors in a third half bridge to emit pulses complementarily, and two switching transistors in a fourth half bridge to emit pulses complementarily.

It should be noted that for a specific process of the multi-level circuit control method disclosed in this embodiment, reference may be made to the content corresponding to FIG. 4(a) and FIG. 4(b). Details are not described herein again.

Another embodiment of this application further discloses a three-phase multi-level circuit control method, to control turn-on or turn-off of a switching transistor in a three-phase multi-level circuit. For a circuit topology of the three-phase multi-level circuit, refer to the content of the embodiments corresponding to FIG. 6 and FIG. 9. Details are not described herein again.

The three-phase multi-level circuit control method disclosed in this embodiment includes:

controlling, in each switching transistor branch of a first multi-level generation unit, two switching transistors in a first half bridge to emit pulses complementarily, and two switching transistors in a second half bridge to emit pulses complementarily; and controlling, in two adjacent switching transistor branches, first switching transistors in first half bridges to emit pulses alternately with a phase difference of N degrees, and second switching transistors in second half bridges to emit pulses alternately with a phase difference of N degrees, where N is a result of dividing 360 by a quantity of switching transistor branches;

controlling, in each switching transistor branch of a second multi-level generation unit, two switching transistors in a first half bridge to emit pulses complementarily, and two switching transistors in a second half bridge to emit pulses complementarily; and controlling, in two adjacent switching transistor branches, first switching transistors in first half bridges to emit pulses alternately with a phase difference of N degrees, and second switching transistors in second half bridges to emit pulses alternately with a phase difference of N degrees, where N is a result of dividing 360 by a quantity of switching transistor branches;

controlling, in a first inverter unit, two switching transistors in a third half bridge to emit pulses complementarily, and two switching transistors in a fourth half bridge to emit pulses complementarily; and controlling, in a second inverter unit, two switching transistors in a third half bridge to emit pulses complementarily, and two switching transistors in a fourth half bridge to emit pulses complementarily.

It should be noted that for a specific process of the multi-level circuit control method disclosed in this embodiment, reference may be made to the content of the embodiments corresponding to FIG. 6 and FIG. 9. Details are not described herein again.

Optionally, to meet a requirement that phase differences between three-phase voltages Vac1, Vac2, and Vac3 from output terminals of the three-phase multi-level circuit are all 120 degrees, the foregoing control method is further used to control turn-on or turn-off of different switching transistors at different phase degrees. The control method further includes:

in a range of 0-60 degrees, controlling a first switching transistor in the fourth half bridge in the first inverter circuit, a second switching transistor in the third half bridge in the second inverter circuit, and a first switching transistor in the fourth half bridge in the second inverter circuit to be turned on;

in a range of 60-120 degrees, controlling a second switching transistor in the third half bridge in the first inverter circuit, the first switching transistor in the fourth half bridge in the first inverter circuit, and the second switching transistor in the third half bridge in the second inverter circuit to be turned on;

in a range of 120-180 degrees, controlling the second switching transistor in the third half bridge in the first inverter circuit, the first switching transistor in the fourth half bridge in the first inverter circuit, and a first switching transistor in the third half bridge in the second inverter circuit to be turned on; or controlling the first switching transistor in the fourth half bridge in the first inverter circuit, a first switching transistor in the third half bridge in the second inverter circuit, and a second switching transistor in the fourth half bridge in the second inverter circuit to be turned on;

in a range of 180-240 degrees, controlling a second switching transistor in the fourth half bridge in the first inverter circuit, the first switching transistor in the third half bridge in the second inverter circuit, and the second switching transistor in the fourth half bridge in the second inverter circuit to be turned on;

in a range of 240-300 degrees, controlling the second switching transistor in the fourth half bridge in the first inverter circuit, a first switching transistor in the third half bridge in the first inverter circuit, and the first switching transistor in the third half bridge in the second inverter circuit to be turned on; and in a range of 300-360 degrees, controlling the second switching transistor in the fourth half bridge in the first inverter circuit, the first switching transistor in the third half bridge in the first inverter circuit, and the second switching transistor in the third half bridge in the second inverter circuit to be turned on; or controlling the second switching transistor in the fourth half bridge in the first inverter circuit, the first switching transistor in the third half bridge in the second inverter circuit, and the second switching transistor in the third half bridge in the second inverter circuit to be turned on.

For a specific implementation process of the foregoing solution, refer to the content of the embodiments corresponding to FIG. 6 and FIG. 9. Details are not described herein again.

What is claimed is:

1. A multi-level circuit, comprising:
   a capacitance branch comprising a first capacitor and a second capacitor that are connected in series, wherein a common terminal of the first capacitor and the second capacitor is grounded;
   at least two switching transistor branches that are connected in parallel to the capacitance branch, wherein each switching transistor branch comprises a first half bridge and a second half bridge, and a common terminal of the first half bridge and the second half bridge of each switching transistor branch is grounded; and
   a first negative coupled inductor and a second negative coupled inductor, wherein each input terminal of the first negative coupled inductor is connected to a common terminal of two switching transistors in the first half bridge in only one of the switching transistor branches; and each input terminal of the second negative coupled inductor is connected to a common terminal of two switching transistors in the second half bridge of only one of the switching transistor branches, wherein a first clamping diode is further connected between the output terminal of the first negative coupled inductor and a terminal, not connected to the second capacitor, of the first capacitor; and a second clamping diode is further connected between the output terminal of the second negative coupled inductor and a terminal, not connected to the first capacitor, of the second capacitor.

2. The multi-level circuit according to claim 1, wherein a third half bridge and a fourth half bridge are separately connected between an output terminal of the first negative coupled inductor and an output terminal of the second negative coupled inductor.

3. The multi-level circuit according to claim 2, wherein two switching transistors in the first half bridge in each switching transistor branch and two switching transistors in the second half bridge in each switching transistor branch, and switching transistors forming the third half bridge and the fourth half bridge in each switching transistor branch are IGBTs that have a diode inside or are MOSFETs.

4. A three-phase multi-level circuit, comprising:
a capacitance branch comprising a first capacitor and a second capacitor that are connected in series, wherein a common terminal of the first capacitor and the second capacitor is grounded;
a first multi-level generation unit and a second multi-level generation unit, wherein the first multi-level generation unit and the second multi-level generation unit each comprise: at least two switching transistor branches that are connected in parallel to the capacitance branch, a first negative coupled inductor, and a second negative coupled inductor, wherein each switching transistor branch comprises a first half bridge and a second half bridge, and a common terminal of the first half bridge and the second half bridge of each switching transistor branch is grounded; each input terminal of the first negative coupled inductor is connected to a common terminal of two switching transistors in the first half bridge of only one of the switching transistor branches; and each input terminal of the second negative coupled inductor is connected to a common terminal of two switching transistors in the second half bridge of only one of the switching transistor branches;
a first inverter unit and a second inverter unit, wherein the first inverter unit comprises: a third half bridge and a fourth half bridge that are separately connected between the first negative coupled inductor and the second negative coupled inductor in the first multi-level generation unit; and the second inverter unit comprises: a third half bridge and a fourth half bridge that are separately connected between the first negative coupled inductor and the second negative coupled inductor in the second multi-level generation unit; and
a first power inductor, a second power inductor, and a third power inductor, wherein the first power inductor is connected to a common terminal of two switching transistors in the fourth half bridge in the first inverter unit; the second power inductor is separately connected to a common terminal of two switching transistors in the third half bridge in the first inverter unit, and a common terminal of the fourth half bridge in the second inverter unit; and the third power inductor is connected to a common terminal of the third half bridge in the second inverter unit.

5. The three-phase multi-level circuit according to claim 4, wherein two switching transistors in the first half bridge and two switching transistors in the second half bridge in each switching transistor branch of the first multi-level generation unit and the second multi-level generation unit, and the switching transistors in the third half bridges and the fourth half bridges of the first inverter unit and the second inverter unit, are IGBTs that have a diode inside or are MOSFETs.

6. The three-phase multi-level circuit according to claim 4, wherein a first clamping diode is further connected between an output terminal of the first negative coupled inductor in each of the first multi-level generation unit and the second multi-level generation unit and a terminal, not connected to the second capacitor, of the first capacitor; and a second clamping diode is further connected between an output terminal of the second negative coupled inductor in each of the first multi-level generation unit and the second multi-level generation unit and a terminal, not connected to the first capacitor, of the second capacitor.

7. The three-phase multi-level circuit according to claim 4, wherein a ground terminal of the three-phase multi-level circuit is further configured to connect to a common terminal of an external three-phase power source, to act as a ground cable of the three-phase power source.

8. A three-phase multi-level circuit control method, applied to the three-phase multi-level circuit according to claim 4, wherein the control method comprises:
controlling, in each switching transistor branch of the first multi-level generation unit, two switching transistors in the first half bridge to emit pulses complementarily, and two switching transistors in the second half bridge to emit pulses complementarily; and controlling, in two adjacent switching transistor branches, first switching transistors in first half bridges to emit pulses alternately with a phase difference of N degrees, and second switching transistors in second half bridges to emit pulses alternately with a phase difference of N degrees, wherein N is a result of dividing 360 by a quantity of switching transistor branches;
controlling, in each switching transistor branch of the second multi-level generation unit, two switching transistors in the first half bridge to emit pulses complementarily, and two switching transistors in the second half bridge to emit pulses complementarily; and controlling, in two adjacent switching transistor branches, first switching transistors in first half bridges to emit pulses alternately with a phase difference of N degrees, and second switching transistors in second half bridges to emit pulses alternately with the phase difference of N degrees, wherein N is a result of dividing 360 by a quantity of switching transistor branches;
controlling, in the first inverter unit, two switching transistors in the third half bridge to emit pulses complementarily, and two switching transistors in the fourth half bridge to emit pulses complementarily; and
controlling, in the second inverter unit, two switching transistors in the third half bridge to emit pulses complementarily, and two switching transistors in the fourth half bridge to emit pulses complementarily.

9. The control method according to claim 8, further comprising:

for a phase of the voltage of the output terminal in a range of 0-60 degrees, controlling a first switching transistor in the fourth half bridge in the first inverter unit, a second switching transistor in the third half bridge in the second inverter unit, and a first switching transistor in the fourth half bridge in the second inverter unit to be turned on;

for the phase of the voltage of the output terminal in a range of 60-120 degrees, controlling a second switching transistor in the third half bridge in the first inverter unit, the first switching transistor in the fourth half bridge in the first inverter unit, and the second switching transistor in the third half bridge in the second inverter unit to be turned on;

for the phase of the voltage of the output terminal in a range of 120-180 degrees, controlling the second switching transistor in the third half bridge in the first inverter unit, the first switching transistor in the fourth half bridge in the first inverter unit, and a first switching transistor in the third half bridge in the second inverter unit to be turned on; or controlling the first switching transistor in the fourth half bridge in the first inverter unit, a first switching transistor in the third half bridge in the second inverter unit, and a second switching transistor in the fourth half bridge in the second inverter unit to be turned on;

for the phase of the voltage of the output terminal in a range of 180-240 degrees, controlling a second switching transistor in the fourth half bridge in the first inverter unit, the first switching transistor in the third half bridge in the second inverter unit, and the second switching transistor in the fourth half bridge in the second inverter unit to be turned on;

for the phase of the voltage of the output terminal in a range of 240-300 degrees, controlling the second switching transistor in the fourth half bridge in the first inverter unit, a first switching transistor in the third half bridge in the first inverter unit, and the first switching transistor in the third half bridge in the second inverter unit to be turned on; or for the phase of the voltage of the output terminal in a range of 300-360 degrees, controlling the second switching transistor in the fourth half bridge in the first inverter unit, the first switching transistor in the third half bridge in the first inverter unit, and the second switching transistor in the third half bridge in the second inverter unit to be turned on; or controlling the second switching transistor in the fourth half bridge in the first inverter unit, the first switching transistor in the third half bridge in the second inverter unit, and the second switching transistor in the third half bridge in the second inverter unit to be turned on.

* * * * *

UNITED STATES PATENT AND TRADEMARK OFFICE
CERTIFICATE OF CORRECTION

| | |
|---|---|
| PATENT NO. | : 11,239,765 B2 |
| APPLICATION NO. | : 16/698517 |
| DATED | : February 1, 2022 |
| INVENTOR(S) | : Zhuyong Huang, Xiaofei Zhang and Chuntao Zhang |

It is certified that error appears in the above-identified patent and that said Letters Patent is hereby corrected as shown below:

In the Claims

Claim 1, Column 17, Line 9, delete "between the output" and insert --between an output--.

Claim 1, Column 17, Line 12, delete "between the output" and insert --between an output--.

Claim 2, Column 17, Line 18, delete "between an output" and insert --between the output--.

Claim 2, Column 17, Line 19, delete "between an output" and insert --between the output--.

Claim 9, Column 19, Line 1, delete "for a phase of the voltage of the output" and insert --for a phase of a voltage of an output--.

Signed and Sealed this
Nineteenth Day of April, 2022

Katherine Kelly Vidal
*Director of the United States Patent and Trademark Office*